Dec. 5, 1933.  W. A. HUMMEL  1,938,071
CONTROL SYSTEM FOR HOISTING APPARATUS
Filed May 18, 1929  10 Sheets-Sheet 5

Inventor:-
Willard A. Hummel
by his Attorneys
Howson & Howson

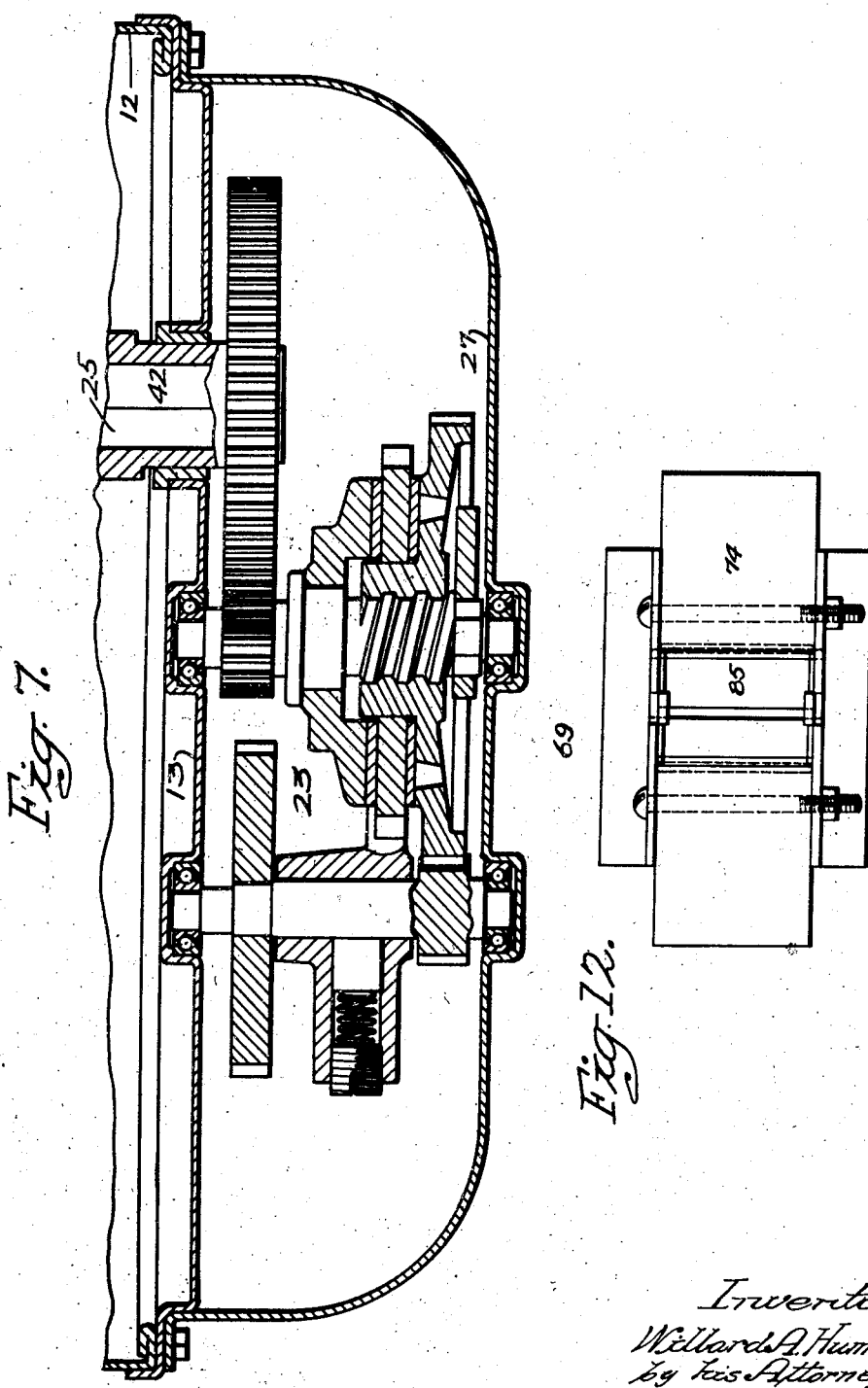

Dec. 5, 1933.  W. A. HUMMEL  1,938,071
CONTROL SYSTEM FOR HOISTING APPARATUS
Filed May 18, 1929   10 Sheets-Sheet 8
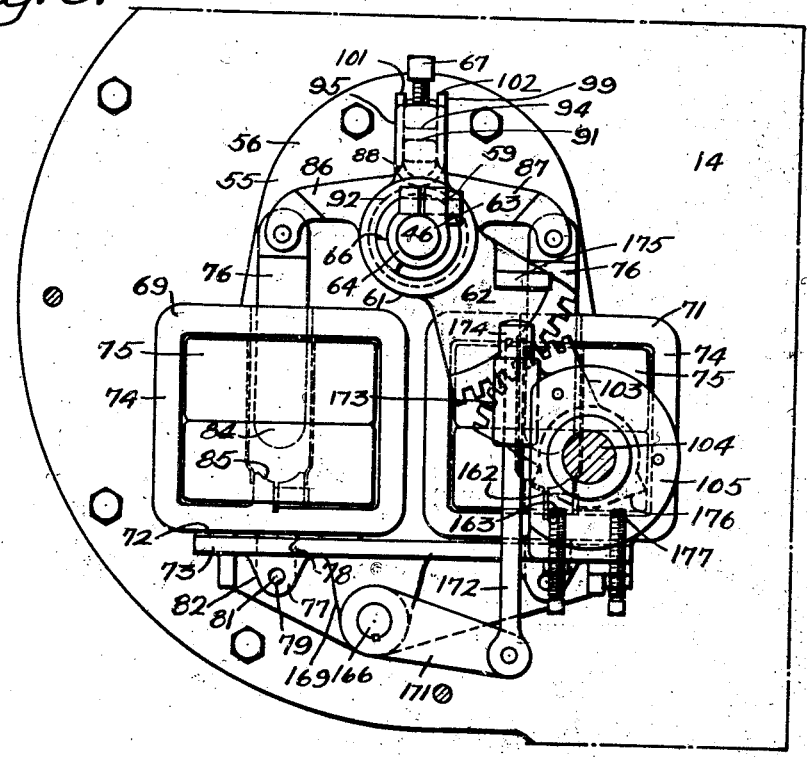
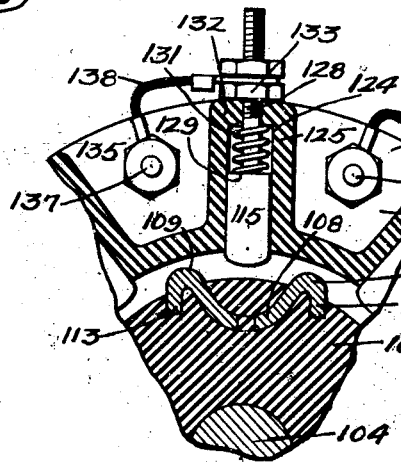
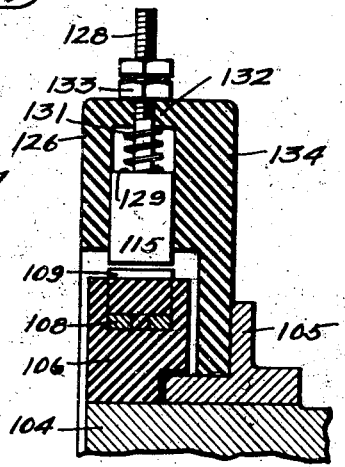

Dec. 5, 1933.   W. A. HUMMEL   1,938,071
CONTROL SYSTEM FOR HOISTING APPARATUS
Filed May 18, 1929   10 Sheets-Sheet 10

Inventor:-
Willard A. Hummel
by his Attorneys.
Howson & Howson

Patented Dec. 5, 1933

1,938,071

UNITED STATES PATENT OFFICE 1,938,071.

CONTROL SYSTEM FOR HOISTING APPARATUS

Willard A. Hummel, Philadelphia, Pa., assignor to American Engineering Company, Philadelphia, Pa., a corporation of Pennsylvania Application May 18, 1929. Serial No. 364,240

12 Claims. (Cl. 254—168)

My invention relates to hoisting apparatus, and it has for one object the provision of simple and efficient control mechanism that shall be characterized by the relatively small expense thereof and the minimum space required.

Another object of my invention is to provide a compact, drum-controlled, upper and lower limit-switch mechanism, in combination with hand-controlled, limit-switch operating means, said parts being built into the hoist during the original construction thereof, rather than attached thereto as extra equipment.

Still another object of my invention is to provide hand-controlled, solenoid operating means for the main control switch, as well as additional switch-actuating means operated by the hoisting drum, the connection between the drum and the solenoid operating means being such that the former may cause the actuation of the control switch while the latter is also operative thereon without disturbing the position of the solenoid plunger. Should the plunger be moved under these conditions, the drum-controlled operating means would be subjected to relatively large retarding forces which would tend to decrease the life of the parts and hence lower the factor of safety of the apparatus.

A further object of my invention is to provide stop mechanism, whereby the operation of the motor may be automatically discontinued when the hoisting block reaches a desired position with respect to the hoisting drum, regardless of the number of revolutions of the drum. The drum-controlled actuating means for the motor switch is dependent for its operation upon a predetermined number of revolutions of the drum. So long as the cable winds uniformly on the drum, the number of drum revolutions is an accurate indication of the position of the hook, but if the cable should fail to wind uniformly, then the hook may reach its highest safe limit of travel before the drum has made the required number of revolutions necessary to cause the operation of the switch, with a resulting jamming of the parts.

A still further object of my invention is to provide in hoisting apparatus, an electric motor wherein the brake therefor is built into the same, the brake parts lying within the outer diameter of the motor casing.

Other objects and applications of my invention, as well as details of construction and operation, whereby the same may be practiced, will be apparent more fully hereinafter, when taken in connection with the accompanying drawings, wherein Fig. 1 is a transverse sectional view of a hoist embodying my invention, taken on the line 1—1 of Fig. 2;

Fig. 7 is a horizontal sectional view, taken on the line 7—7 of Fig. 2, showing the gearing interconnecting the driving motor and the cable drum;

Fig. 8 is a transverse sectional view taken on the line 8—8 of Fig. 4;

Fig. 12 is a plan view of the structure of Fig. 11;

Figs. 13 and 14 are enlarged detail vertical sectional views through the commutator limit-switch.

Figure 1:
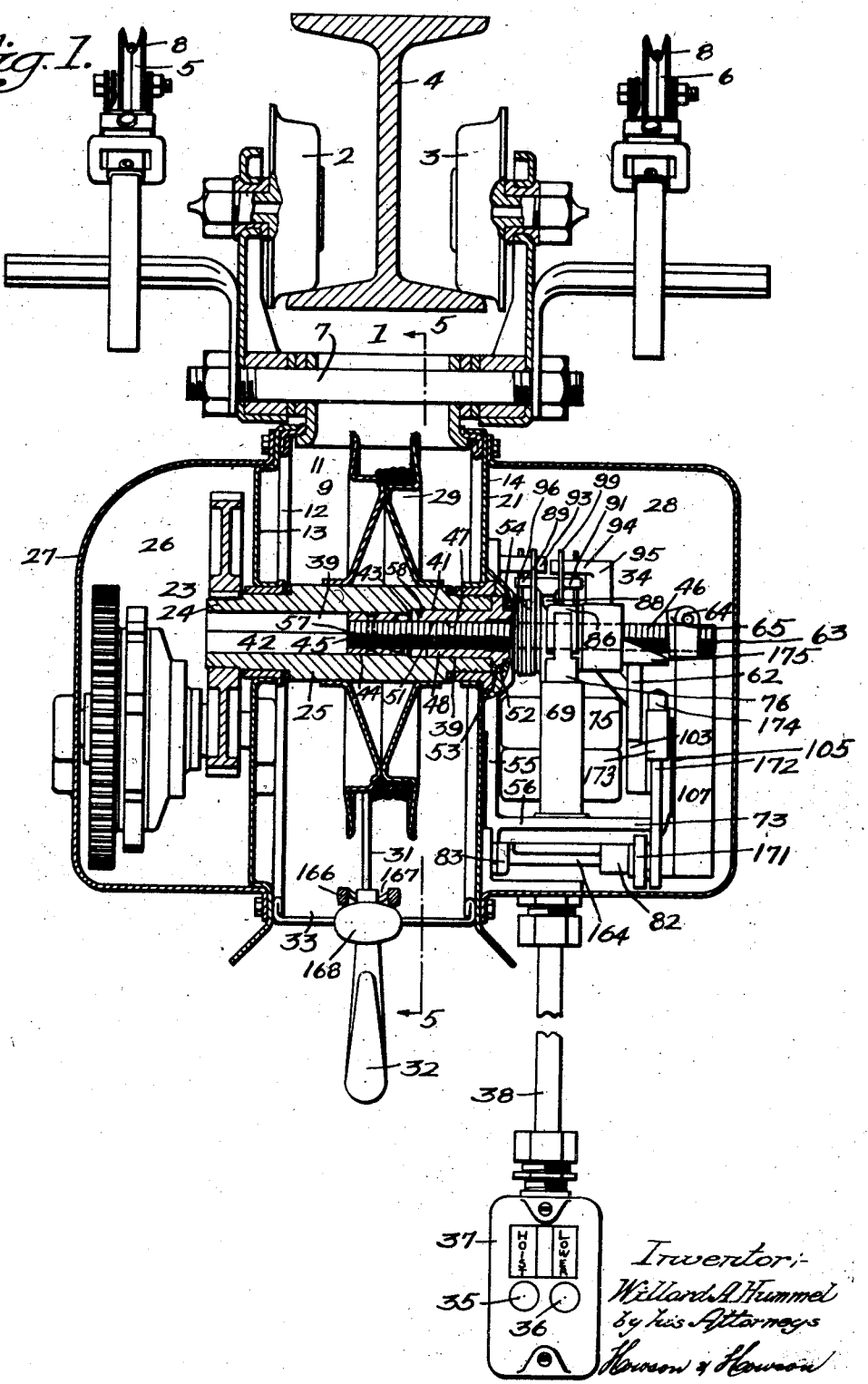
Figure 2:
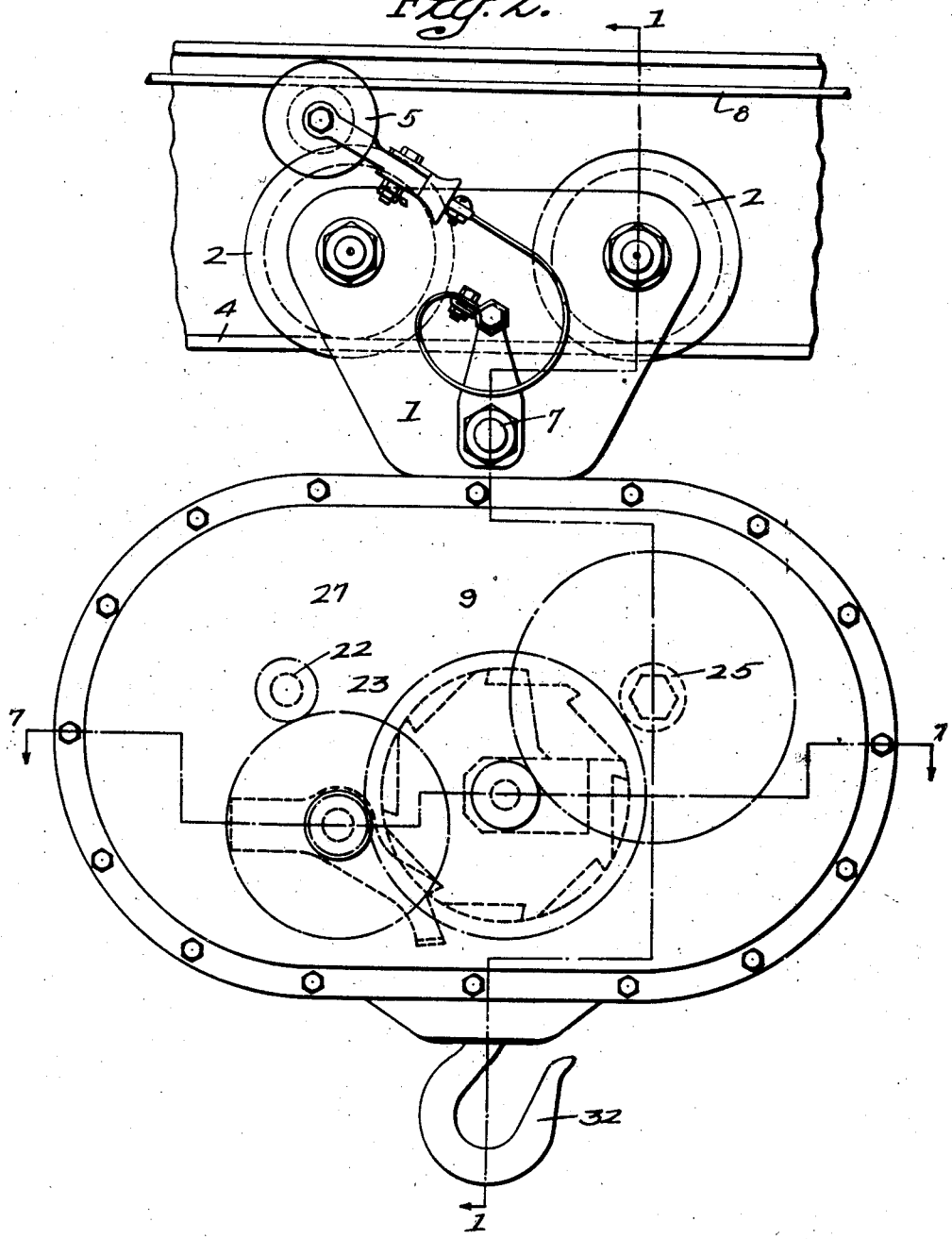
Fig. 2 is a side elevational view of the structure of Fig. 1, looking from the right.

Referring to Fig. 1, the structure therein shown comprises broadly a trolley frame 1 which is provided with pairs of wheels 2 and 3 mounted on a track formed by an I-beam 4; a pair of current collectors 5 and 6 which are mounted on a main supporting pivot bolt 7 and adapted to co-operate with supply conductors 8; and a main hoist body portion 9 which is supended from the trolley frame 1 by means of the pivot bolt 7.

The main body portion 9 is provided with a central winding drum and motor chamber 11 which is formed by means of a central frame 12 of oblong form and side plates 13 and 14. A motor 15 is positioned in the chamber 11 with one end portion 16 of the motor seated in an opening formed in the side plate 13, and with another end portion 17 passing through an aperture 18 in the opposite side plate 14 and supported therein by means of a flange 19 which is bolted against an outer side 21 of the side plate 14. A shaft 22 of the motor 15 is connected by gear-wheel mechanism 23 to a projecting end portion 24 of a shaft 25 journaled in the side frame 13. An opposite end of the shaft 25 extends through the side plate 14 and is journaled therein. An enclosed gear chamber 26 for the mechanism 23 is formed by means of a housing 27 which is secured to the side plate 13.

The structural details of certain of the parts forming these chambers, as well as the trolley frame details constitute the subject matter of my co-pending application, Serial No. 364,239, filed May 18, 1929 now Patent No. 1,903,235, dated March 28, 1933 and assigned to the American Engineering Company. The detail structure of the current collectors 5 and 6, as well as the mounting therefor, is described and claimed in the co-pending application of Earl R. Jones, Serial No. 329,040, filed December 28, 1928 now Patent No. 1,752,182, dated Mar. 25, 1930, and assigned to the American Engineering Company.

A drum 29 is mounted on the shaft 25 intermediate the side plates 13 and 14 and it is provided with a cable 31 which is connected to a hook 32 movable through an opening 33 formed in the bottom portion of the drum chamber 11. The structure of the drum 29 is further described and claimed in detail in a co-pending application, Serial No. 329,058, filed December 28, 1928, now Patent No. 1,912,483, dated June 6, 1933, and assigned to the American Engineering Company, for which application I am named as joint inventor with Earl R. Jones.

The control chamber 28 is provided with apparatus 34 permitting the raising and lowering of the hoisting hook 32 in accordance with the operation of switches 35 and 36 positioned at a push-button station 37 mounted on the lower end of a tubular supporting member 38. The apparatus 34 is also adapted to cause the automatic de-energization of the driving motor 15 when the hoisting drum 29 has made a predetermined number of revolutions, as well as when the hoisting hook 32 assumes a predetermined position with respect to the drum 29, all as will presently appear.

Considering the control apparatus 34 in greater detail, the drum shaft 25 is provided with an axial aperture 39 having an enlarged portion 41 and a reduced portion 42 so as to form a shoulder 43 therebetween. The portion 42 is of hexagonal cross-section and is adapted to receive slidably a complementary member 44 which is pinned to an inner end 45 of a threaded rod 46. The rod 46 is thus afforded a splined connection to the drum 29, since relative axial movement only can obtain between the shaft 25 and the threaded rod 46. The rod 46 passes through an aperture 47 formed in an elongated sleeve nut 48, an inner end portion 49 of which extends into the enlarged portion 41 of the aperture 39 and is journaled therein. A portion 51 of the sleeve 48, which is positioned in the aperture 41, is threaded to receive the rod 46 so as to serve as a nut therefor.

Longitudinal movement of the sleeve nut 48 is prevented by means of a flange 52 which is formed intermediate the ends thereof. One side of the flange 52 abuts against an end portion 53 of the drum shaft 25, while an opposite side fits in a recess 54 formed in an upright wall portion 55 of a bracket member 56. The wall 55 is bolted or otherwise secured to the outer side 21 of the side plate 14. The shaft 25, as well as the vertical wall 55 of the bracket 56, affords the nut 48 a movable support, permitting the rotation thereof but preventing axial movement when the drum 29 revolves. The securing of the nut 48 in this manner results in the axial movement of the threaded rod 46 when the drum 29 is turned.

Adjacent end portions of the member 44 and the nut 48 are provided with co-acting clutch faces 57 and 58 which are engageable when the drum has made a predetermined number of revolutions in the hoisting direction. The continued movement of the drum 29 then causes the turning of the nut 48 through a predetermined angle, as will presently appear in greater detail.

The portion of the sleeve nut 48 extending beyond the wall 55 of the bracket 56 affords a movable support for a sleeve member 59 and a hub portion 61 of a gear-wheel segment 62. An outer end portion 63 of the threaded rod 46 is provided with an axially adjustable clutch member 64 having a clutch face 65 which is movable into engagement with a clutch face 66 on the adjacent end of the sleeve nut 48 when the hoisting drum 29 has moved a desired number of revolutions in the lowering direction. The axial adjustment of the clutch member 64 away from the clutch face 66 of the nut 48 increases the number of drum revolutions before the clutch faces 65 and 66 are actuated into engagement, thereby increasing the drum travel and correspondingly increasing the downward travel of the hook 32, while the adjustment of the member 64 toward the nut 48 decreases the drum travel necessary to bring the clutch faces 65 and 66 into engagement and, therefore, decreases the downward travel of the hook 32.

When it is desirable to regulate the upward travel of the hoisting hook 32, the nut 48 is so turned as to cause the clutch faces 57 and 58 to approach or separate depending upon whether or not it is desired to lower or raise the maximum upper limiting position of the hook 32. It is noted that the turning of the nut 48 also causes a simultaneous adjustment of the clutch faces 57 and 65 and, therefore, permits the hook 32 to have various upper and lower limiting positions. In actual practice, the upper limiting position of the hook 32 is first obtained by adjusting the nut 48, and the lower limiting position is next determined by the adjustment of the clutch member 64.

The nut member 48 is connected to the hub 61 of the gear segment 62 by means of a set-screw 67, permitting the adjustment of the nut 48 relative thereto. The nut 48 may be provided with a plurality of recesses 68 adapted to receive an inner end portion of the set-screw 67, thereby assuring a more rigid connection between these parts. The gear segment 62 may be operated independently of the drum-controlled clutch members 44 and 64 by means of a pair of solenoids 69 and 71 which are mounted on an upper side 72 of a horizontal wall portion 73 of the bracket 56. Each of the solenoids comprises a frame 74 for a magnetizing winding 75, and a centrally-positioned plunger 76. The frame 74 is provided with a depending portion 77 which extends through an opening 78 in the bottom wall 73. An aperture 79 is formed in the depending portion 77 directly below the wall 73 and is adapted to receive a locking-pin 81, the ends of which are secured in spaced apertured lugs 82 and 83 positioned on the under side of the bracket wall 73.

In this way, each of the solenoid frames 74 is detachably secured in position.

As shown in Fig. 8, an inner end 84 of each of the solenoid plungers 76 is rounded, so that they may more readily seat in a curved base portion 85 of each of the frames 74. Experience has shown that by thus forming the inner end of the plungers 76, the solenoids 69 and 71 are rendered more quiet in operation. The plungers 76 are connected at their upper ends to arms 86 and 87 which extend outwardly from the sleeve 59 at points positioned substantially mid-way of the longitudinal length thereof. The sleeve 59 is also provided with an upwardly-extending lug 88 having a pair of oppositely extending arms 89 and 91 which are positioned in spaced relation to an outer side 92 of the sleeve 59 and parallel to the longitudinal axis thereof. The arm 89 is disposed directly beneath an outwardly extending lug or arm 93 on the outer side of the vertical bracket wall 55, while the arm 91 is positioned directly below an arm 94 extending inwardly from a raised boss 95 on the upper side of the hub 61 of the gear segment 62.

A centering spring 96 encircles that portion of the outer side 92 of the sleeve 59 between the bracket wall 55 and the pair of arms 86 and 87, opposite ends 97 and 98 of the spring 96 being positioned on opposite sides of the pair of arms 89 and 93. The sleeve 59 with its arms 86, 87 and solenoid plungers 76, 76 thus constitute a floating, spring-centered member, inasmuch as a movement thereof in either direction is resisted by the spring 96. A spring 99 encircles that portion of the sleeve 59 between the arms 86 and 87 and the hub 61 of the gear segment 62, end portions 101 and 102 being positioned respectively on opposite sides of the arms 91 and 94, so that a movement of the arm 91 in either direction from the central position established by the spring 99 is resisted. The gear-wheel segment 62, with its hub portion 61 and arm 94, also constitutes a floating, spring-centered member, but it is noted that this member has a lost-motion spring connection to the solenoid plungers 76, as well as a lost-motion connection to the threaded rod 46 with its clutch members 44 and 64.

The relation of the several parts is such that the motion imparted to the gear segment 62 by either of the drum-controlled clutch members 44 or 64 is opposite to that imparted by the solenoid plungers 76, 76, the former serving to return the gear segment 62 to its original mid-position following the movement of the segment 62 from such position by the solenoid plungers 76, 76. The tension of the spring 99 is such that the reverse movement of the gear segment 62 effected by one of the drum-controlled clutch members 44, 64, occurs without causing the actuation of the solenoid plungers 76, 76 from their working position. Should the resilient lost-motion connection between the gear segment 62 and the plungers 76, 76 be omitted and an attempt made to actuate the segment 62 by means of one of the clutch members 44, 64, while one of the solenoids 69, 71 is energized, extremely large loads would be carried by the drum-controlled clutches and the several connected parts would be subjected to strains of undesirable intensity.

The gear-wheel segment 62 is connected to a co-operating gear-wheel segment 103, which is mounted on a shaft 104 carried by a vertical pedestal 105 positioned on the outer edge of the horizontal bracket wall 72. The shaft 104 serves to support a rotary member 106 of a commutator limit-switch 107. The switch member 106 is provided with a plurality of contact members 108, forming pairs of contact portions 109, 111 and 112. Each of the contact members 108 is provided with intermediate and end bent-back portions 113 and 114 which are imbedded in the outer periphery of the switch member 106 so as to leave exposed the contact portions 109.

The contact members 108 co-operate with a plurality of contact members 115, 116, 117, 118, 119, 121, 122 and 123 which are positioned in radial slots 124 formed in a plurality of block-like housings 125 mounted on an outer side 126 of a circular plate 127. Each of the contact members is provided with a threaded stem portion 128 forming a shoulder 129 constituting one abutment for a spring 131, an opposite end of which engages an end wall 132 of the housing 125. The threaded end 128 extends outwardly of the housing 125 and is provided with a nut 133 which serves to limit the inward movement of the contact member under the force of the spring 131. The circular member 127 is provided with a transversely-extending flange 134 at its inner edge which extends outwardly to the outer end of the housings 125. Thus, a recess 135 is formed between successive pairs of housings 125 and the side flange 134. A portion 136 of the side flange 134 intermediate adjacent housings 125 is provided with a binding post 137 which extends inwardly into the recess 135. A flexible conductor 138 may serve to connect the binding post 137 and the threaded extension 128 of the conductor.

Figure 15:
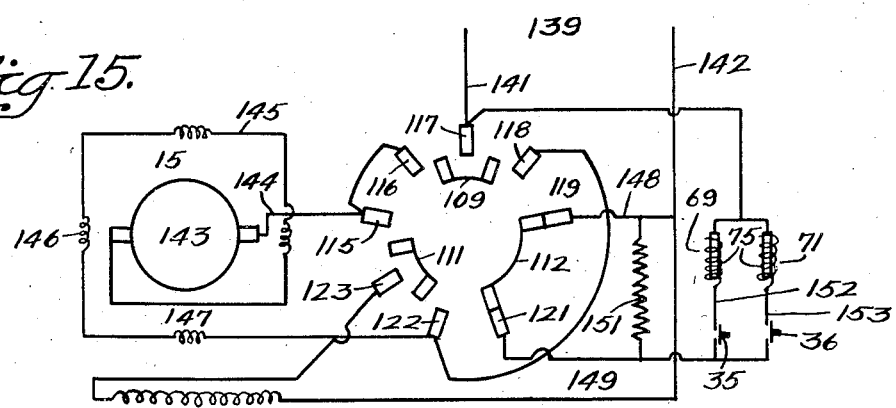
Figs. 15, 16 and 17 are diagrammatic views of circuits and apparatus embodying my invention.
Figure 16:
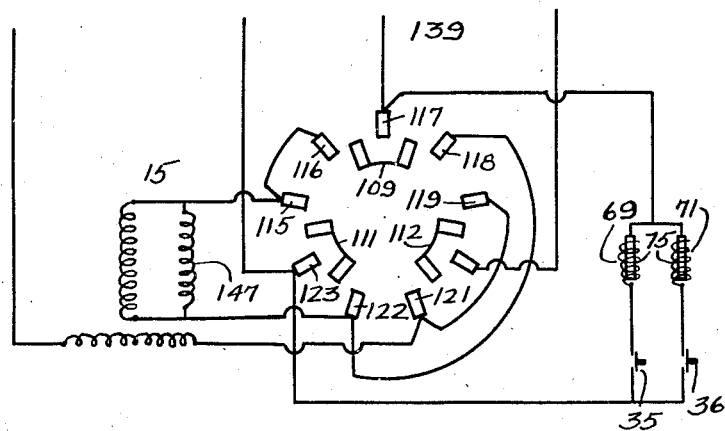
Figure 17:
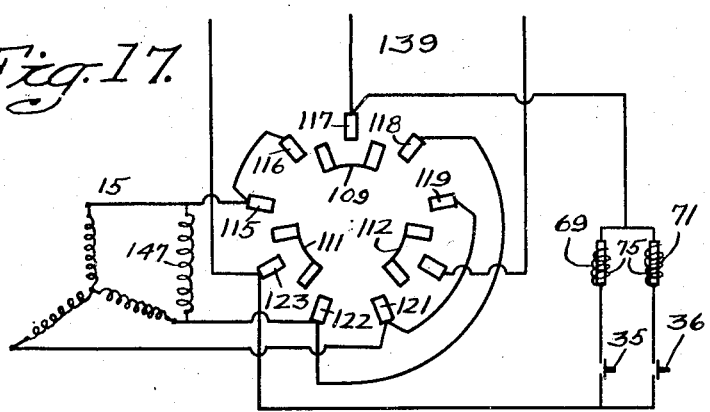

Fig. 15 illustrates diagrammatically the circuits and apparatus embodying my invention when a direct current-motor is employed, while Figs. 16 and 17 illustrate the connections for two-phase and three-phase motors, respectively. Referring to Fig. 15, it will be noted that a main energizing circuit 139 is provided with conductors 141 and 142 which are respectively connected to the contact members 117 and 123. The contact members 115 and 116 are connected together and to the armature 143 of the motor 15 by means of a conductor 144. The contact members 122 and 118 are connected together and to the armature 143 by means of a conductor 145. A magnetizing winding 146 for a magnetic brake apparatus 147 is connected in the conductor 145 between the armature 143 and the contact member 122. The contact members 119 and 121 are respectively connected by conductors 148 and 149 to the conductors 142 and 141 of the main energizing circuit 139.

A resistor 151 is connected across the conductors 148 and 149. The conductor 149 is provided with a pair of branch circuits 152 and 153 which respectively contain the push-button switches 35 and 36 and the magnetizing coils 75 of the solenoids 69 and 71. The rotor member 106 of the limit-switch 107 in this figure occupies its mid or neutral position, wherein it will be noted that the pairs of contacts 109 and 111 are disengaged from their co-acting contact members, but that the pairs of contact portions 112 are in engagement with their pair of co-acting contact members 119, 121, permitting the energization of one of the solenoids 69, 71, depending upon the push-button switch closed.

Figure 4:
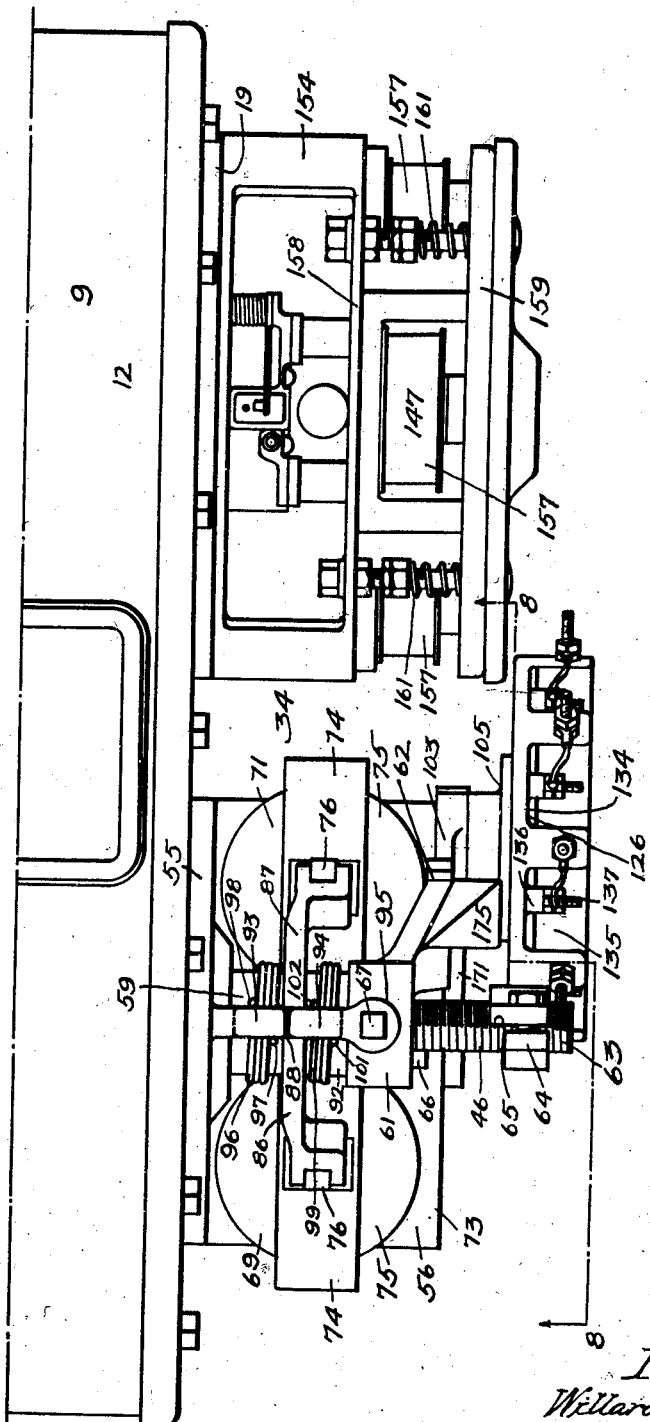
Fig. 4 is an enlarged top plan view of the control mechanism of Fig. 3, as well as the magnetic brake which is built in the outer end portion of the driving motor.
Figure 5:
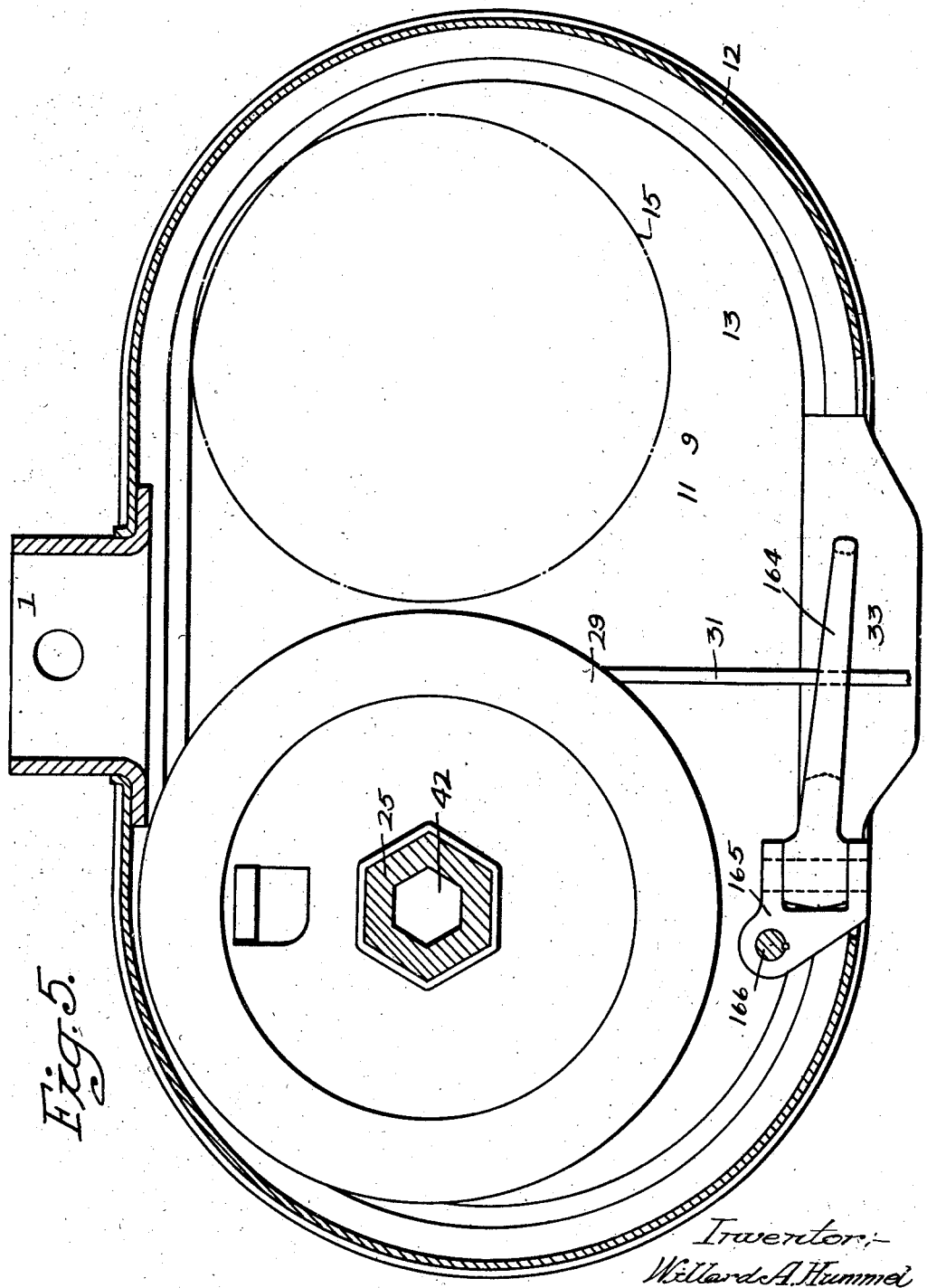
Fig. 5 is an enlarged detail, longitudinal sectional view, taken on the line 5—5 of Fig. 1.
Figure 6:
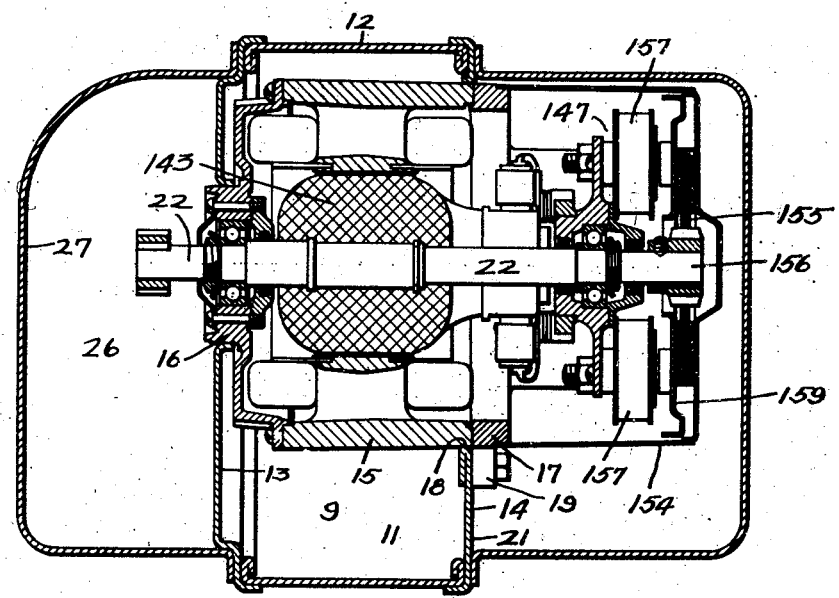
Fig. 6 is a similar view, taken on the line 6—6 of Fig. 3.
Figure 11:
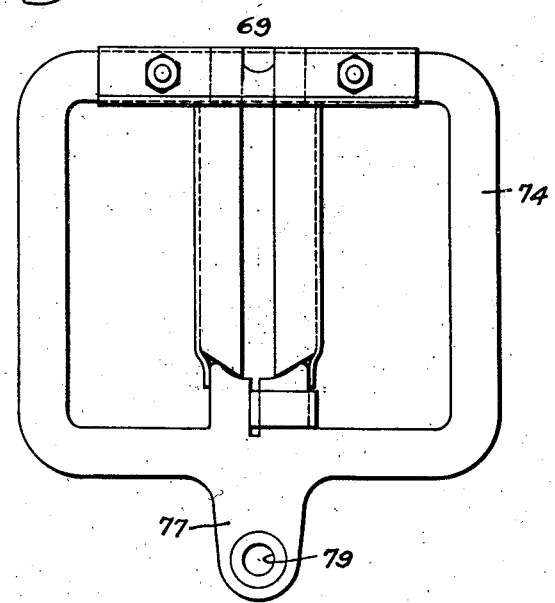
Fig. 11 is a detail view of the supporting frame for one of the solenoids.

The detail structure of the solenoid brake 147, which is shown diagrammatically in Fig. 15, is illustrated in detail in Figs. 4 and 6, wherein it will be noted that the brake 147 is built directly into the motor 15, the several brake parts lying within the outer diameter of a housing 154 of the motor. The brake 147 briefly comprises a disk 155, which is mounted on an outer end 156 of the motor shaft 22, and a plurality of magnets 157 which are secured to a cross frame 158 of the motor housing 154 and disposed concentrically of the motor axis. The magnets 157 co-operate with a second brake disk 159 which is normally forced by springs 161 into such brake engagement with the disk 155 as to prevent the turning of the motor shaft 22 when the motor 15 is de-energized. The force of the magnets 157 upon the brake disk 159, however, is such as to release the braking engagement when the magnet windings 146 are energized in accordance with the operation of the limit-switch 107.

Figure 3:
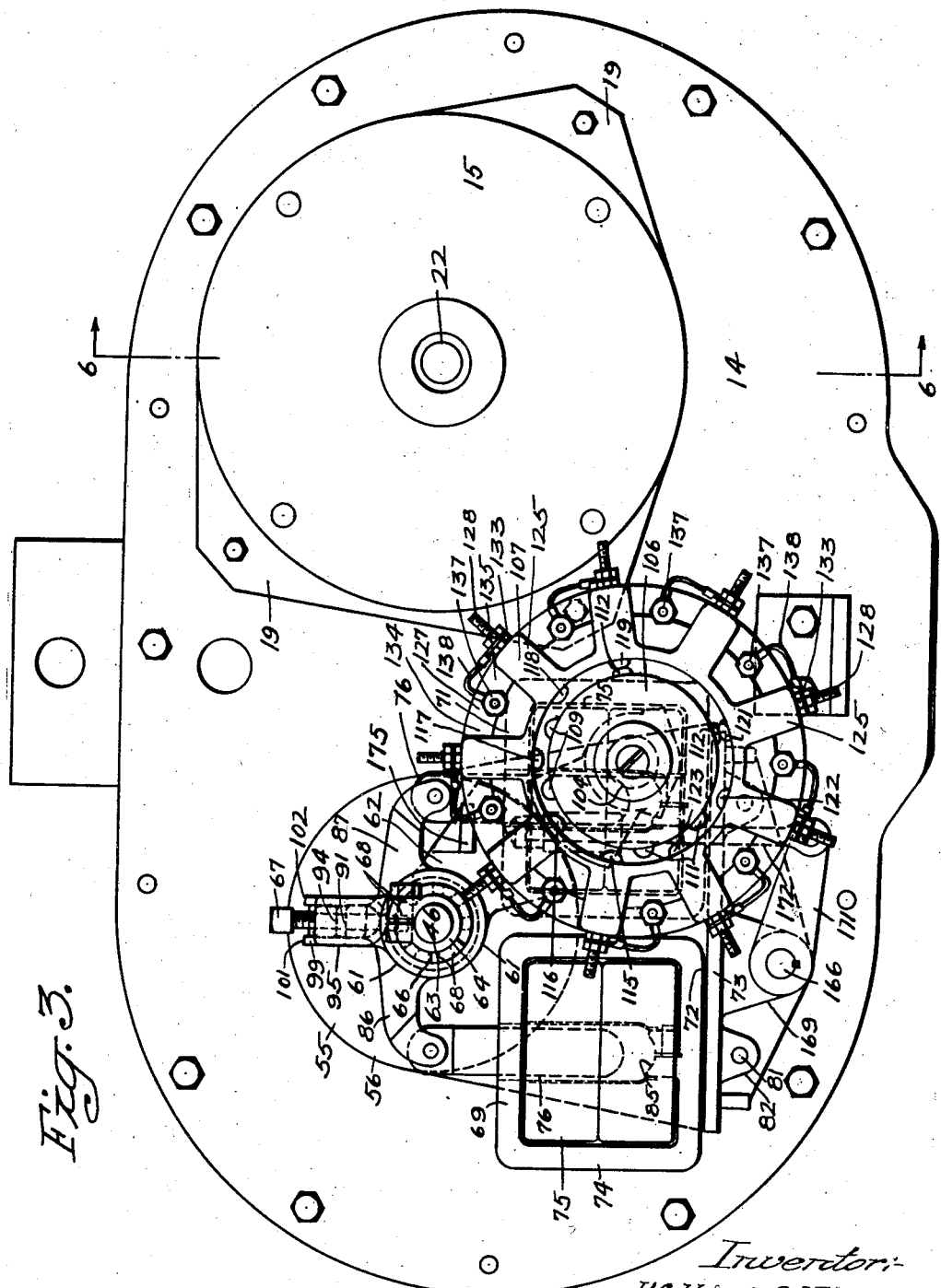
Fig. 3 is an enlarged detail, side elevational view of the hoist control mechanism, showing its position on the drum housing with respect to the driving motor.

In operation, when it is desired to raise the hook 32, the push-button switch 35 is actuated to close the energizing circuit through the solenoid 69. This circuit extends from the conductor 142 through the conductor 148, the contact members 119, 121, the co-acting contact portions 112, the push-button switch 35, the actuating winding 75 of the solenoid 69, to the conductor 141. It is noted that so long as the rotary switch member 106 is in the position shown in Fig. 3, the resistance 151 is short-circuited. The energization of the solenoid 69 causes the movement of the plungers 76 and hence the actuation of the arms 86 and 87 of the sleeve 59 which are connected therewith, this movement being resisted by the centering spring 96. The movement of the sleeve 59 is imparted to the gear segment 62 by reason of the resilient connection therewith afforded by the centering spring 99. The turning of the gear segment 62 causes the actuation of the gear segment 103, a shoulder 162 thereof abutting against an adjustable stop 163 carried by the horizontal bottom wall 73 of the bracket 56, at the same time that one of the plungers 76 engages the frame portion 85 of the solenoid 69.

Figure 9:
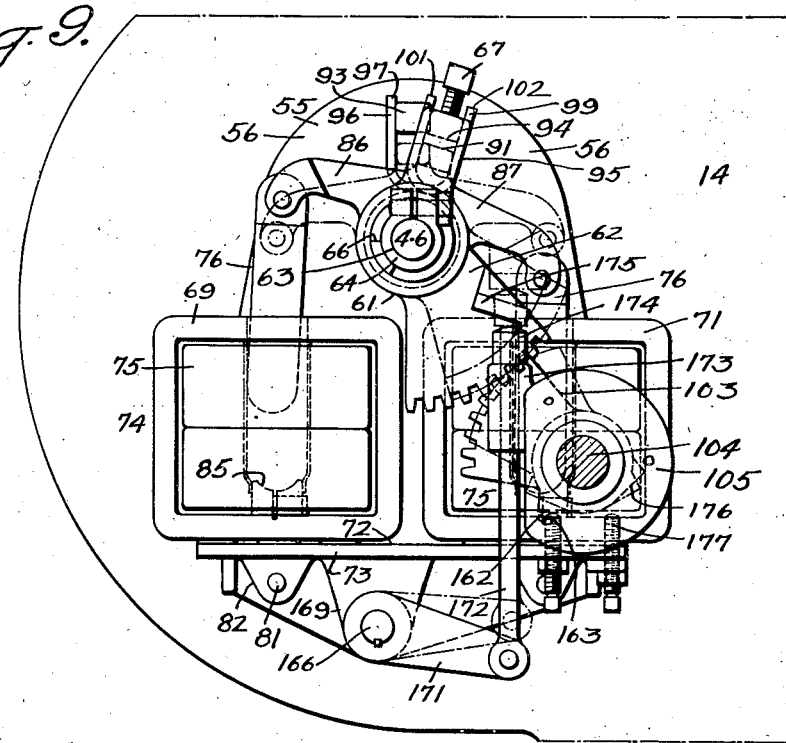
Fig. 9 is a side elevation view of the control mechanism with the parts in the hoisting position.
Figure 10:
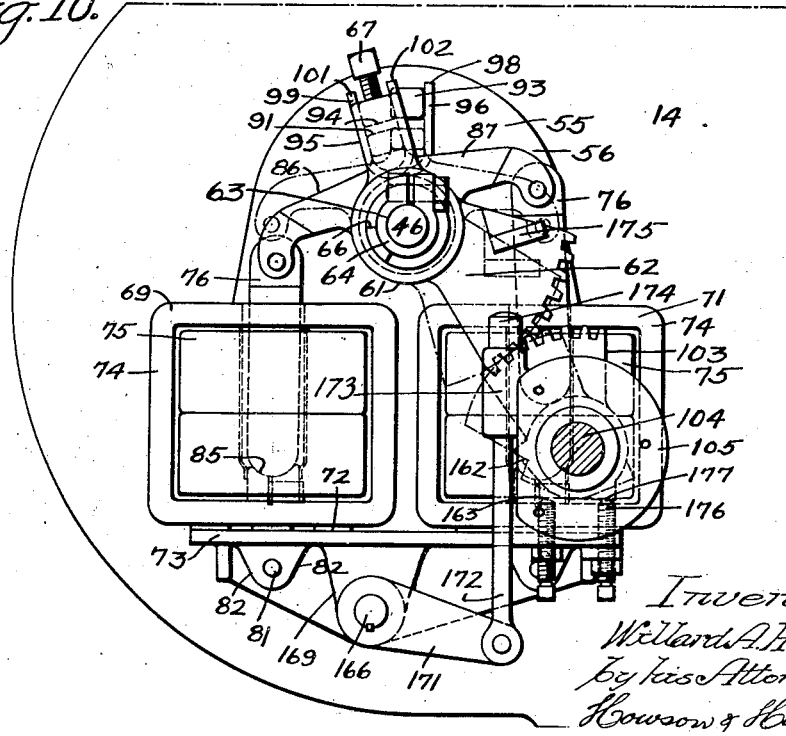
Fig. 10 is a view similar to Fig. 9 with the parts in the lowering position.

The movement of the gear segment 103 causes the turning of the rotary switch member 106 from the position shown in Fig. 8 to the position shown in Fig. 9, wherein it will be noted that the pairs of contact portions 109 and 111 are actuated into engagement with the pairs of contact members 116, 117 and 123, 122, resulting in the energization of the brake magnets 157 and the armature and field windings of the motor 15. The energization of the brake magnets 137 results in the release of the motor brake 147, permitting the now energized motor to operate in the usual manner. The movement of the switch member 106 also disengages the contact portions 112 from their co-acting contact members 119, 121, so that the resistance 151 is connected directly in series-circuit relation with the solenoid 71. This resistance now decreases the current flow through the solenoid 69 and thus prevents the overheating of the latter.

The operation of the driving motor 15 causes the turning of the cable drum 29 and the lifting of the hook 32. The raising of the hook 32 continues until the clutch face 57 engages the clutch face 58, resulting in the turning of the sleeve nut 48. This motion is transmitted through the gear-wheel mechanism 62, 103 to the rotary switch member 106, causing the same to move from the advanced position to its original mid-position shown in Fig. 3. The reverse operation of the limit-switch 107 causes the de-energization of the motor 15 and the brake magnets 157, so that the motor 15 is very quickly brought to rest by means of the springs 161 and the co-acting brake disks 155 and 159. At this time, the resistance 151 is also short-circuited by the rotor contact portions 112. It is noted that if the switch member 106 should be actuated by the drum 29 slightly beyond its mid-position into the reversing position, the motor 15 is reversed, thereby quickly stopping the further travel of the drum 29 and permitting the switch member 106 to return to its mid-position under the force of the centering spring 99. An advantage of this slight reverse drum movement is that it permits the release of the hoisting rope 31 and the hook 32 in the event that jamming occurs, due, for example, to a slight over-travel of the hoisting drum 29.

Should the cable 31 not wind uniformly on the drum 29, then the hook 32 may reach its upper limiting position before the drum 29 has made the desired number of revolutions necessary to bring the clutch faces 57 and 58 into engagement. The jamming of the hoisting hook 32 at this time is prevented by the operation of auxiliary control means for the limit-switch 107, comprising a lever 164 which is mounted for horizontal pivotal movement on a lever 165. The lever 165 is mounted for vertical movement on a shaft 166. The lever 164 is provided with an aperture 167 for the cable 31, and it is designed to prevent a shouldered portion 168 of the hook 32 from passing therethrough.

The shaft 166 passes through a bearing 169 carried by the lower bracket wall 73 and terminates in a crank arm 171 carrying a vertically movable push-rod 172 on its free end. The push-rod 172 is guided in a vertical bearing 173 supported by the bracket 56. An upper free end 174 of the push-rod 172 is so positioned as to engage a shoulder 175, which is carried by the gear segment 62, when the latter is in its advanced position due to the operation of the solenoid 71. Hence, when the shoulders 168 of the hook 32 engage the lever arm 164, the latter is lifted, causing a corresponding movement of the push-rod 172. Since the rod 172 is in engagement with the gear shoulder 175, the vertical movement of the rod 172 causes the turning of the gear segments 62 and 103 and the return of the switch member 106 to its original mid-position, wherein the motor is de-energized and the brake is rendered effective. This operation of the limit-switch 107 occurs independently of the drum and solenoid switch-actuating means.

When the hook 32 is to be lowered, the push-button switch 36 is closed, causing the energization of the solenoid 71 and the operation of the switch member 106 from the solid-line position of Fig. 8 to the solid-line position shown in Fig. 9. The motor brake 147 is now energized, releasing the motor 15, and the latter is supplied with currents in the reverse direction, causing the motor shaft 22 to turn in the lowering direction. It is noted that the movement of the rotary switch member 106 from its mid-position is limited by the engagement of a shoulder 176 thereof with an adjustable abutment 177 carried by the bottom wall 72 of the bracket 56. The drum 29 continues to move in the lowering direction until the hook 32 has reached its lower desired limit of travel, at which time, the clutch faces 65 and 66 engage, causing a reverse movement of the gear segment 62 against the force of the spring 99. The position of the solenoid plunger 76, however, is not changed in view of the lost-motion connection therewith afforded by the centering spring 99 and the pair of arms 91 and 94. The reverse movement of the gear-segment 62 causes a return movement of the rotary switch member 106 from its lowering position to the solid-line position of Fig. 3, at which time the motor 15 is de-energized and the brake 147 is applied.

While I have shown only one form of embodiment of my invention, for the purpose of describing the same and illustrating its principles of construction and operation, it is apparent that various changes and modifications may be made therein, without departing from the spirit of my invention. I desire, therefore, that only such limitations shall be imposed thereon, as are indicated by the appended claims or as are demanded by the prior art.

I claim:

1. In apparatus of the character described, the combination with a control switch, a drum of electromagnetic means having a lost-motion spring connection with said switch, and means controlled by the drum having a lost-motion connection with said switch, whereby said switch may be independently operated by either of said means.

2. Apparatus of the character described comprising, in combination, a driven member, a switch means for connecting said driven member to said switch, electromagnetic apparatus having an element movable from one position to another, means whereby said driven member may be actuated upon the movement of said element, and independent actuating means for said driven member adapted to cause a reverse movement thereof, said first-mentioned means permitting said reverse movement while said element occupies said last-mentioned position.

3. In apparatus of the character described, in combination, a pair of operating members, and a driven member having a lost-motion connection to one of said pair of members and a spring connection with the other, said spring connection permitting a relative movement between said last-mentioned member and said driven member when the force therebetween exceeds a predetermined value.

4. Apparatus of the character described comprising, in combination, a spring-centered member, a solenoid, means operatively connecting said spring-centered member to said solenoid and a switch-operating member spring-centered with respect to said first-mentioned member.

5. Apparatus of the character described comprising, in combination, driving means, a spring-centered switch-operating member having a lost-motion connection with said driving means, and a spring-centered solenoid operating member for said switch-operating member.

6. In apparatus of the character described, the combination with a hoisting drum provided with a cable carrying a hoisting hook and a driving motor for said drum, of a control switch, and means effective to cause the operation of said switch when said cable hook assumes a predetermined spaced relation with respect to said drum, said means including a push member, and gear-wheel mechanism connected to said control switch and adapted to be actuated by said push member.

7. A commutator switch for a hoist, comprising a central member provided with spaced contact elements, and an outer member provided with a plurality of spring-pressed co-operating contact members, said outer member comprising a cylindrical body provided with radially-extending portions recessed to receive said contact members, a flange for closing one end of the recess formed between adjacent radially-extending portions, and a binding post mounted on said end flange and extending into said recess.

8. Apparatus of the character described comprising a pair of solenoids provided with plungers, a support, and a spring-centered member connected to said plungers, and pivotally mounted on said support, the free end portions of said plungers being rounded.

9. In apparatus of the character described, the combination with a supporting bracket provided with a recess, of a solenoid frame mounted on one side of said bracket provided with a portion extending through said recess to the other side of said bracket, and means positioned on one side of said bracket in co-operative relation to said frame portion for locking said frame in position.

10. In a hoist, the combination with a driving motor, a drum connected therewith provided with a hook, a control switch for said motor, means whereby said switch may be operated when said hook has moved between predetermined upper and lower positions, an adjustable member operatively connected to said control switch, means for actuating said member in one direction to limit the upward travel of said hook, and adjustable means for actuating said member in another direction to limit the downward travel of said hook.

11. In a hoist, the combination with a driving motor, a drum connected therewith provided with a hook, a control switch for said motor, an adjustable member operatively connected to said switch, means for actuating said member in one direction to limit the upward travel of said hook, and adjustable means for actuating said member in another direction to limit the downward travel of said hook.

12. In a hoist, the combination with a driving motor, a drum connected therewith provided with a hook, a control switch for said motor, an adjustable member operatively connected to said switch, clutch means provided at each end of said member, an axially movable member, a clutch member provided on said last mentioned member adapted to engage one of the clutches on said adjustable member to actuate the latter in one direction to limit the upward travel of said hook, and additional adjustable clutch means provided on said axially movable member adapted to engage the other of said clutches on said adjustable member to actuate the latter in another direction to limit the downward travel of said hook.

WILLARD A. HUMMEL.